United States Patent Office 3,787,417
Patented Jan. 22, 1974

---

3,787,417
DIALKYLTIN SALTS OF SUBSTITUTED
PYRIDINE-1-OXIDES
Charles W. Kaufman, Hamden, Conn., assignor to
Olin Corporation
No Drawing. Application July 18, 1969, Ser. No. 843,218,
now Patent No. 3,705,943, which is a continuation-in-
part of abandoned application Ser. No. 596,801, Nov.
25, 1966. Divided and this application June 28, 1972,
Ser. No. 266,948
Int. Cl. C07d 29/36
U.S. Cl. 260—270 R                                8 Claims

---

ABSTRACT OF THE DISCLOSURE

Certain dialkyltin salts of 2-mercaptopyridine-1-oxide and 2-hydroxypyridine-1-oxide are prepared by reacting the respective oxides with a dialkyltin salt of a low molecular weight organic or inorganic acid. The resulting salts are highly effective bactericides and fungicides which have especially low toxicity to higher animals.

---

This application is a continuation-in-part of U.S. Ser. No. 596,801, filed Nov. 25, 1966 and now abandoned.

This is a division of application Ser. No. 843,218, filed July 18, 1969, now U.S. Pat. 3,705,943.

This invention relates to certain dialkyltin salts of 2-mercaptopyridine-1-oxide and 2-hydroxypyridine-1-oxide. More particularly, this invention relates to metal derivatives prepared by reacting 2-mercaptopyridine-1-oxide or 2-hydroxypyridine-1-oxide with a dialkyltin salt of a low molecular weight organic or inorganic acid.

The novel compounds of this invention have the formula:

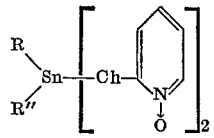

wherein R and R″ are independently selected from the group consisting of alkyl of from 4 to 8 carbon atoms and Ch is a chalcogen selected from the group consisting of sulfur and oxygen.

The compound herein referred to as 2-mercaptopyridine-1-oxide, although generally represented as:

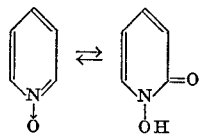

(I)

is believed to be a mixture of two tautomeric isomers as follows:

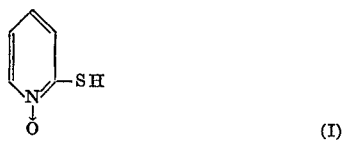

In a like manner the compound herein referred to as 2-hydroxypyridine-1-oxide, although generally represented as:

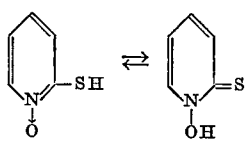

(II)

is believed to be a mixture of two tautomeric isomers as shown below:

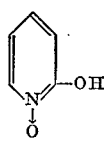

This tautomerism will not be alluded to hereinafter, it being understood that the tautomeric forms of I and II are included when referring to the compounds of this invention either by formulae such as I and II or by name.

The compounds of this invention can be prepared by a method which comprises interacting 2-marcaptopyridine-1-oxide or 2-hydroxypyridine-1-oxide, preferably in the form of a soluble salt, such as an alkali metal salt or ammonium salt thereof, with a dialkyltin salt of a lower molecular weight organic or inorganic acid in a solvent for the reactants and recovering the reaction product.

Dialkyltin salts suitable for use as starting materials of the process of this invention have the formula:

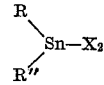

wherein R and R″ are independently selected from the group consisting of alkyl of from 4 to 8 carbon atoms and X is the anion of a lower molecular weight inorganic or organic acid. The anions which may be mentioned include nitrates, acetates, formates, sulfates and halides. Suitable anions have an atomic or molecular weight below about 127.

Preferably, the reaction is carried out using substantially stoichiometric proportions of the two reactants. The reaction can be conducted in a wide variety of inert organic solvents. Monohydric alcohols, such as methanol, ethanol, butanol, etc. and hydrocarbon solvents such as benzene, toluene or xylene, are particularly useful solvents. The product can be recovered from the reaction mixture by any of a number of methods well known in the art, such as by filtration to remove insoluble products formed during the reaction following which the desired product can be recovered from the filtrate by evaporation, extraction with solvents or by any other convenient methods.

Useful dialkyltin salts include, for example:

di-n-butyltin dichloride,
sec.-butyl n-octyl dichloride,
isoamyl n-hexyltin dibromide,
di-n-octyltin dichloride,
di-n-octyltin dibromide,
di-n-octyltin sulfate,
di-n-octyltin dinitrate,
di-n-octyltin diacetate,
di-isooctyltin diformate,
di-isooctyltin diiodide and
di-n-heptyl dichloride.

The following examples are illustrative of, but not limitative of, the invention.

EXAMPLE I

Di-n-butyltin salt of 2-mercaptopyridine-1-oxide

Di-n-butyl tin dichloride was dissolved in 50 ml. of methanol. A solution of 0.10 mole of the sodium salt of 2-mercaptopyridine-1-oxide in 150 ml. of methanol was added to the di-n-butyltin dichloride solution with stirring. Then the mixture was heated on steam bath for 0.5 hour and filtered hot. The filtrate was chilled to 10° C. and 0.035 mole of white crystals, M.P. 90–92° C., was recovered representing a 70 percent yield of the di-n- butyltin salt of 2-mercaptopyridine-1-oxide having the formula:

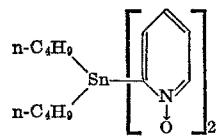

*Analysis.*—Calcd. for $C_{18}H_{26}N_2O_2S_2Sn$ (percent): C, 44.4; H, 5.34; N, 5.76; Sn, 24.3. Found (percent): C, 44.35, 44.32; H, 5.36, 5.45; N, 5.80, 5.91; Sn, 22.7.

EXAMPLE II

Di-n-octyltin salt of 2-mercaptopyridine-1-oxide

A solution of 0.1 mole of the sodium salt of 2-mercaptopyridine-1-oxide in 100 ml. of methanol was added to 0.05 mole of di-n-octyltin dichloride in 100 ml. methanol. A white precipitate formed which was filtered off. The filter cake was recrystallized from acetone giving 41 percent yield of the dioctyltin salt of 2-mercaptopyridine-1-oxide, M.P. 90–93° C' having the formula:

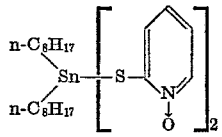

EXAMPLE III

Di-n-butyltin salt of 2-hydroxypyridine-1-oxide 0.2 mole of 2-hydroxypyridine-1-oxide was dissolved in methanol. Then 0.2 mole of sodium hydroxide was added to form the sodium salt. To the slurry of the sodium salt of 2-hydroxypyridine-1-oxide was added 0.1 mole of di-n-butyltin chloride. The reaction mass was stirred for 30 minutes and then was filtered. The filtrate was concentrated on a steam bath to a volume of 150 ml. and on cooling 0.091 (91 percent of the theoretical yield) mole of the di-n-butyltin salt of 2-hydroxypyridine-1-oxide having the formula:

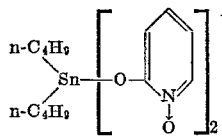

was obtained.

EXAMPLE IV

Di-n-octyltin salt of 2-hydroxypyridine-1-oxide

To di-n-octyltin dichloride, 20 g. (0.05 mole) dissolved in 150 ml. of methanol, there was added 22 g. (0.10 mole) of 2-hydroxypyridine-1-oxide with stirring. Then 6.5 g. of sodium hydroxide dissolved in 100 ml. of methanol was added following which the reaction mixture was boiled for 20 minutes and filtered hot. After the filtrate had been concentrated on a steam bath to 115 ml. it was chilled to a temperature of about 10° C. The white solid which precipitated was recovered and then recrystallized from methanol. A total of 12.0 g. of the di-n-octyltin salt of 2-hydroxypyridine-1-oxide, M.P. 68–70° C., (41 percent yield of the theoretical yield) having the formula:

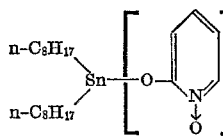

was obtained.

*Analysis.*—Calcd. for $C_{26}H_{42}N_2O_4Sn$ (percent): C, 51.2; H, 7.45; N, 4.97; Sn, 20.9. Found (percent): C, 55.04, 55.29; H, 7.46, 7.54; N, 5.61, 570; Sn, 20.0.

The compounds of this invention are active bactericides and fungicides as indicated by the following in vitro spectra tabulated in Tables I and II which follow (data on hexachlorophene being included for comparison).

TABLE I
Antibacterial spectrum

| Organism | M.I.C., g./ml. | | | |
|---|---|---|---|---|
| | A | B | C | D |
| Staphylococcus aureus P209 | 0.08 | 0.10 | 0.37 | 0.06 |
| Bacillus subtilis | 0.047 | 0.19 | 18.7 | |
| Streptoccocus faecalis | 0.96 | 0.41 | 9.4 | |
| Klebsiella pneumoniae | 4.7 | 4.8 | >100.0 | 18.7 |
| Pseudomonas aeruginosa | 18.7 | 25.0 | 75.0 | 6.3 |
| Proteus vulgaris | 18.7 | 18.7 | >100.0 | |
| Escherichia coli | 9.4 | 14.0 | >100.0 | |
| Salmonella schottmuelleri | 9.4 | 8.6 | >100.0 | |
| Aerobacter aerogenes | 6.3 | 4.7 | 75.0 | |
| Mycobacterium tuberculosis BCG | | 0.04 | 4.7 | 0.32 |
| Desulfovibrio desulfricans | | 0.13 | | |

A = Di-n-butyltin salt of 2-mercaptopyridine-1-oxide.
B = Di-n-octyltin salt of 2-mercaptopyridine-1-oxide.
C = Di-n-octyltin salt of 2-hydroxypyridine-1-oxide.
D = Hexachlorophene.

TABLE II
Antifungal spectrum

| Organism | M.I.C., g./ml. | | | |
|---|---|---|---|---|
| | A[a] | B | C | D |
| Candida albicans | 0.06 | 8.5 | >100.0 | 12.5 |
| Penicillium notatum | 0.14 | 0.63 | 50.0 | |
| Trichophyton mentagrophytes | 0.39 | 0.28 | 50.0 | |
| Asperigillus fumigatus | 0.39 | 0.63 | 50.0 | |
| Asperigillus niger | 0.25 | 1.8 | >100.0 | 6.3 |
| Pullularia pullullans | 0.08 | 0.72 | >100.0 | |

[a] Names of the individual compounds are given in footnotes of Table I.

Although the zinc salt of 2-mercaptopyridine-1-oxide is a highly effective antibacterial agent for many applications, its extremely low solubility in materials, such as organic solvents, prevents its use in certain important applications. In contrast, the compounds of this invention which have appreciable solubility in, for example, methyl alcohol, ethyl alcohol, acetone, hexane, xylene, can be conveniently introduced into a product or process as a solution of the compound in the solvent. In Table III which follows the solubility of some of the compounds of this invention in various solvents is shown (data on the zinc salt of 2-mercaptopyridine-1-oxide being included for comparison):

TABLE III

| Product | Solubility, g./100 ml. at 25° C. | | |
|---|---|---|---|
| | Ethyl alcohol | Hexane | Xylene |
| Zinc salt of 2-mercaptopyridine-1-oxide | Insoluble | Insoluble | Insoluble |
| Di-n-butyltin salt of 2-mercaptopyridine-1-oxide of Example I | 4.0 | 0.1–0.3 | 25 |
| Di-n-octyltin salt of 2-mercaptopyridine-1-oxide of Example II | >80.0 | 74 | >80 |

Certain other organic tin salts of 2-hydroxypyridine-1-oxide have antibacterial and/or antifungal properties but are not suitable for many uses due to their high toxicity to higher animals. Table IV presents data on the $LD_{50}$ dose of some of the compounds of this invention compared with other compounds showing the markedly low toxicity of the products of this invention against mice.

TABLE IV

| Compound: | Acute oral $LD_{50}$ |
|---|---|
| Di-n-butyltin salt of 2-mercaptopyridine-1-oxide (Product of Example I) | 1000 |
| Triphenyltin salt of 2-mercaptopyridine-1-oxide | 90 |
| Tri-n-butyltin salt of 2-mercaptopyridine-1-oxide | 125 |
| Di-n-octyltin salt of 2-mercaptopyridine-1-oxide (Product of Example II) | 2000 |
| Di-n-octyltin salt of 2-hydroxypyridine-1-oxide (Product of Example IV) | >2000 |

Since the compounds of this invention possess broad antibacterial and antifungal properties, they are utilized as preservatives in a wide variety of products, as mildew proofing agents, and for sterilization and disinfecting purposes. The compounds of this invention are especially useful as preservatives in leather, paint, paper, etc. and in plastics and other fabrics to render them proof against mildew or other fungus attack. In the protection of fabrics, for example, with a compound of this invention, the compound may be applied or incorporated in the fabric in a number of ways such as by soaking or spraying it with hexane solution of the compound, for example, ethyl alcohol, hexane, or xylene and then allowing the solvent to evaporate. Suitably an effective amount of a compound of the invention is applied to the substrate, for example, from about 0.001 to 1 percent by weight.

What is claimed is:

1. A compound of the formula:

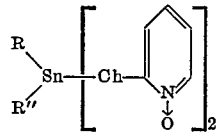

wherein R and R'' are independently selected from the group consisting of alkyl of from 4 to 8 carbon atoms and Ch is a chalcogen selected from the group consisting of sulfur and oxygen.

2. The compound of claim 1 wherein R and R'' are each n-butyl and Ch is S.

3. The compound of claim 1 wherein R and R'' are each n-octyl and Ch is S.

4. The compound of claim 1 wherein R and R'' are each n-butyl and Ch is O.

5. The compound of claim 1 wherein R and R'' are each n-octyl and Ch is O.

6. The compound of claim 1 wherein R and R'' are the same.

7. The compound of claim 6 wherein Ch is S.

8. The compound of claim 6 wherein Ch is O.

References Cited

UNITED STATES PATENTS

| | | | |
|---|---|---|---|
| 2,867,566 | 1/1959 | Weinberg | 260—270 R |
| 3,236,733 | 2/1966 | Karsten | 260—270 R |
| 3,269,904 | 8/1966 | Bernstein | 260—270 R |
| 3,284,296 | 11/1966 | Freiberg | 260—270 R |
| 3,321,480 | 5/1967 | Schroder et al. | 260—270 R |
| 3,321,481 | 5/1967 | Schroder et al. | 260—270 R |
| 3,705,943 | 12/1972 | Kaufman | 260—270 R |
| 3,498,985 | 3/1970 | Kaufman | 260—270 R |
| 3,583,999 | 6/1971 | Damico | 260—270 R |
| 3,629,264 | 12/1971 | Pardee | 260—270 R |
| 3,661,911 | 5/1972 | Meyer | 260—270 R |

OTHER REFERENCES

Ismail: Chem. Abstr., vol. 68, col. 13128t, abstracting France 1,475,896, April 1967.

Petridis et al.: Chem. Abstr., vol. 73, col. 30445y (1970).

Manulkin: Jour. Gen. Chem. U.S.S.R., vol. 20, 2076 (1950).

DONALD G. DAUS, Primary Examiner